United States Patent
Sumimoto et al.

(10) Patent No.: US 6,737,453 B2
(45) Date of Patent: May 18, 2004

(54) FLAME RETARDANT THERMOPLASTIC RESIN COMPOSITION

(75) Inventors: Norifumi Sumimoto, Tokyo (JP); Masahiko Noro, Tokyo (JP); Kunio Matsusaka, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/729,927

(22) Filed: Dec. 6, 2000

(65) Prior Publication Data
US 2003/0050368 A1 Mar. 13, 2003

(30) Foreign Application Priority Data
Dec. 9, 1999 (JP) ............................. 11-350695

(51) Int. Cl.$^7$ .............................. C08K 5/52; C08K 5/20
(52) U.S. Cl. ..................... 524/127; 524/138; 524/233; 524/235; 524/395
(58) Field of Search .................. 524/127, 128, 524/233, 235, 395

(56) References Cited

U.S. PATENT DOCUMENTS

| | | | | |
|---|---|---|---|---|
| 4,965,315 A | * | 10/1990 | Maeda et al. | |
| 5,039,714 A | * | 8/1991 | Kasahara et al. | |
| 5,272,193 A | * | 12/1993 | Fuhr et al. | |
| 5,760,120 A | * | 6/1998 | Itoh et al. | |
| 6,451,889 B1 | * | 9/2002 | Jang et al. | |
| 2002/0065343 A1 | * | 5/2002 | Jang et al. | |

FOREIGN PATENT DOCUMENTS

| | | |
|---|---|---|
| EP | 0 288 298 B1 | 10/1988 |
| JP | 7-292233 | 7/1995 |
| JP | 10-237246 | 8/1998 |

* cited by examiner

*Primary Examiner*—Tae H. Yoon
(74) *Attorney, Agent, or Firm*—Nixon & Vanderhye P.C.

(57) ABSTRACT

The present invention relates to a flame retardant thermoplastic resin composition comprising:

(A) 100 parts by weight of a rubber-reinforced thermoplastic resin comprising:
  a graft copolymer (A1) produced by graft-polymerizing a monomer component (b) containing an aromatic vinyl compound, a cyanided vinyl compound and, if required, the other copolymerizable monomer in the presence of a rubber polymer (a) containing polymer particles having a particle size of not more than 150 nm in an amount of 0 to 15% by weight, polymer particles having a particle size of from more than 150 to less than 350 nm in an amount of 60 to 100% by weight and polymer particles having a particle size of not less than 350 nm in an amount of 0 to 40% by weight, or a mixture of the graft copolymer (A1) and a copolymer (A2) of monomer component (b'),
  said rubber-reinforced thermoplastic resin (A) having a graft ratio of 20 to 150% and a rubber polymer content of 8 to 20% by weight; and (B) 5 to 20 parts by weight of a phosphorus-based flame retardant comprising a condensed phosphoric acid ester, a phosphazene compound or mixture thereof.

4 Claims, No Drawings

FLAME RETARDANT THERMOPLASTIC RESIN COMPOSITION

BACKGROUND OF THE INVENTION

The present invention relates to a flame retardant thermoplastic resin composition. More particularly, it relates to a non-halogen-based flame retardant thermoplastic resin composition which are excellent in impact resistance, heat resistance and flame retardancy, especially practical impact resistance.

Conventionally, ABS resins having flame retardant properties have been extensively used in various applications such as electric and electronic devices and office automation (OA) devices because these resins are excellent in moldability, mechanical properties or the like. In recent years, there is a tendency that the use of halogen-based flame retardants in these products should be avoided from the viewpoint of environmental protection. For this reason, there have been presently marketed such flame retardant materials composed of a polycarbonate (PC)/ABS alloy resin as a base resin and a phosphate-based flame retardant.

However, in the case where the polycarbonate (PC)/ABS alloy resin is used in combination with the phosphate-based flame retardant, the obtained materials tend to show a poor moldability and be deteriorated in chemical resistance.

In consequence, conventionally, many studies have been made to produce flame retardant materials from ABS base resins and a non-halogen-based flame retardant without using the PC resins. However, there have not been developed any practical materials capable of exhibiting a flammability evaluation rating of V-0 or higher as prescribed in UL94 as well as satisfactory properties.

As a result of the present inventors' earnest study to solve the above problem, it has been found that the problem can be solved by such a flame retardant thermoplastic resin composition comprising a specific rubber-reinforced thermoplastic resin and a specific phosphorus-based flame retardant. The present invention has been attained on the basis of the above finding.

SUMMARY OF THE INVENTION

An object of the present invention is to provide a flame retardant thermoplastic resin composition containing an ABS resin as a base resin and a phosphoric acid-based flame retardant which is capable of exhibiting a flammability rating of V-2 as prescribed in UL94 and can be used in extensive applications due to excellent properties thereof.

To attain the above aim, in an aspect of the present invention, there is provided a flame retardant thermoplastic resin composition comprising:

(A) 100 parts by weight of a rubber-reinforced thermoplastic resin comprising:

a graft copolymer (A1) produced by graft-polymerizing a monomer component (b) containing an aromatic vinyl compound, a cyanided vinyl compound and, if required, the other copolymerizable monomer in the presence of a rubber polymer (a) containing polymer particles having a particle size of not more than 150 nm in an amount of 0 to 15% by weight, polymer particles having a particle size of from more than 150 to less than 350 nm in an amount of 60 to 100% by weight and polymer particles having a particle size of not less than 350 nm in an amount of 0 to 40% by weight, or a mixture of the graft copolymer (A1) and a copolymer (A2) of monomer component (b'), said rubber-reinforced thermoplastic resin (A) having a graft ratio of 20 to 150% and a rubber polymer content of 8 to 20% by weight; and (B) 5 to 20 parts by weight of a phosphorus-based flame retardant comprising a condensed phosphoric acid ester, a phosphazene compound or mixture thereof, which condensed phosphoric acid ester is represented by the general formula (I):

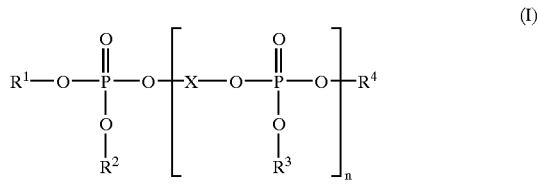

wherein $R^1$, $R^2$, $R^3$ and $R^4$ are independently phenyl or xylenyl; X is a divalent group derived from resorcinol or bisphenol A; and n is 0.5 to 1.2.

DETAILED DESCRIPTION OF THE INVENTION

The rubber-reinforced thermoplastic resin (A) used in the present invention (hereinafter referred to as "rubber-reinforced resin") comprises a graft copolymer (A1) produced by graft-polymerizing a monomer component (b) containing an aromatic vinyl compound, a cyanided vinyl compound and, if required, the other copolymerizable monomer in the presence of a rubber polymer (a) having a specific particle size distribution, or a mixture of the graft copolymer (A1) and a copolymer (A2) of a monomer component (b').

As the rubber polymers (a), there may be exemplified polybutadiene, hydrogenated products of polybutadiene, styrene/butadiene copolymers, butadiene/acrylonitrile copolymers, ethylene/propylene or ethylene/propylene/non-conjugated diene copolymers, ethylene/butene-1 or ethylene/butene-1/non-conjugated diene copolymers, isobutylene/isoprene copolymers, acrylic rubbers, styrene/butadiene/styrene block copolymers, styrene/isoprene/styrene block copolymers, polyurethane rubbers, silicone rubbers or the like. Examples of the styrene/butadiene copolymers may include styrene/butadiene random copolymers, styrene/butadiene block copolymers or hydrogenated products thereof.

The rubber polymers may be used alone or in the form of a mixture of any two or more thereof. Among these rubber polymers, polybutadiene, styrene/butadiene copolymers, ethylene/propylene or ethylene/propylene/non-conjugated diene copolymers and silicone rubbers are preferred. The rubber polymers used in the present invention are preferably latex-like polymers though not limited thereto.

In the present invention, the particle size distribution of the rubber polymer (a) is very important. The rubber polymer is required to have the following particle size distribution. Namely, the rubber polymer contains polymer particles having a particle size of not more than 150 nm in an amount of 0 to 15% by weight, preferably 0 to 12% by weight; polymer particles having a particle size of from more than 150 to less than 350 nm in an amount of 60 to 100% by weight, preferably 65 to 100% by weight; and polymer particles having a particle size of not less than 350 nm in an amount of 0 to 40% by weight, preferably 0 to 35% by weight.

When the particle size distribution of the rubber polymer which has a large influence on rubber orientation of molded products, lies within the above-specified range, the obtained molded products can exhibit a good practical impact strength. Here, the "rubber orientation" means such a phenomenon that rubber particles are deformed in the flowing direction by shear force applied upon molding. When the rubber orientation becomes remarkable, the practical impact strength of the obtained molded product is lowered. When the content of the rubber polymer having a particle size of not more than 150 nm is more than 15% by weight, the stress distribution effect by rubber particles within the molded product may be deteriorated, resulting in poor practical impact strength of the molded product. When the content of the rubber polymer having a particle size of not less than 350 nm is more than 40% by weight, the rubber orientation of the molded product becomes considerably increased, resulting in poor practical impact strength of the molded product. Meanwhile, the "practical impact strength" used in the present invention means a falling weight impact strength.

The particle size distribution of the rubber polymer (a) may be controlled by appropriately selecting kind and amount of emulsifier, kind and amount of initiator, polymerization time, polymerization temperature, stirring conditions, etc., which are ordinarily used upon the production of the rubber polymer. Alternatively, the particle size distribution of the rubber polymer (a) may also be controlled by blending at least two kinds of rubber polymers (a) having different particle sizes with each other.

The rubber polymer (a) has a gel fraction of preferably 40 to 98% by weight, more preferably 50 to 95% by weight, especially preferably 60 to 90% by weight. When the gel fraction of the rubber polymer (a) lies within the above specified range, the obtained molded product is more excellent in gloss and impact resistance on the surface thereof.

Meanwhile, the gel fraction of the rubber polymer (content of toluene-insoluble components) is determined by the following manner. One gram of the rubber polymer is added to 100 ml of toluene. The resultant mixture is allowed to stand at room temperature for 48 hours, and then filtered through a 100-mesh metal screen. The thus separated filtrate is dried to remove toluene therefrom, thereby determining a content (g) of toluene-soluble components. From the thus measured content of toluene-soluble components, the gel fraction of the rubber polymer (a) is calculated according to the following formula:

Gel Fraction (%)=(1(g)−content of toluene-soluble components (g))×100

The content of the rubber polymer (a) in the above rubber-reinforced resin (A) is in the range of usually 8 to 20% by weight, preferably 8 to 18% by weight, more preferably 10 to 15% by weight. When the content of the rubber polymer used in the component (A) is too small, the obtained composition may be deteriorated in impact strength. On the other hand, when the content of the rubber polymer used in the component (A) is too large, the obtained composition may be deteriorated in not only fluidity and stiffness, but also in flammability evaluation rating (flame retardancy).

The gel fraction of the rubber polymer (a) can be controlled by appropriately selecting kind and amount of chain transfer agent, polymerization time, polymerization temperature, final polymerization conversion rate, etc., upon the production of the rubber polymer (a).

The monomer component (b) used in the component (A) contains an aromatic vinyl compound, a cyanided vinyl compound and, if required, the other copolymerizable monomer.

Examples of the aromatic vinyl compounds used in the component (A) may include styrene, α-methyl styrene, o-methyl styrene, p-methyl styrene, tert-butyl styrene, vinyl toluene, methyl-α-methyl styrene, divinyl benzene or the like. Among these aromatic vinyl compounds, styrene and α-methyl styrene are especially preferred.

When α-methyl styrene is used as the monomer component (b) in an amount of 10 to 50% by weight, preferably 20 to 30% by weight, it is possible to impart a more excellent heat resistance to the resin composition of the present invention.

The amount of the aromatic vinyl compound used in the component (A) is preferably 40 to 92% by weight, more preferably 50 to 80% by weight, especially preferably 50 to 70% by weight based on the weight of the monomer component (b). When the amount of the aromatic vinyl compound used is too small, the obtained resin composition may be deteriorated in fluidity and heat stability. On the other hand, when the amount of the aromatic vinyl compound used is too large, the obtained resin composition may be deteriorated in stiffness and chemical resistance.

As the cyanided vinyl compounds used in the component (A), there may be exemplified acrylonitrile, methacrylonitrile or the like. Among these cyanided vinyl compounds, acrylonitrile is preferred.

The amount of the cyanided vinyl compound used in the component (A) is preferably 5 to 45% by weight, more preferably 5 to 40% by weight, especially preferably 10 to 45% by weight based on the weight of the monomer component (b). When the amount of the cyanided vinyl compound used is too small, the obtained resin composition may be deteriorated in stiffness and chemical resistance. On the other hand, when the amount of the cyanided vinyl compound used is too large, the obtained resin composition may be deteriorated in heat stability and fluidity.

Further, the component (A) may contain the other copolymerizable monomer component, if required. As the other copolymerizable monomer components, there may be exemplified unsaturated acid anhydrides, unsaturated acids, imide compounds of unsaturated dicarboxylic acids or the like.

Examples of the unsaturated acids may include maleic anhydride, itaconic anhydride, citraconic anhydride or the like. Examples of the unsaturated acids may include acrylic acid, methacrylic acid or the like. Examples of the imide compounds of unsaturated dicarboxylic acids may include maleimide, N-methyl maleimide, N-butyl maleimide, N-phenyl maleimide, N-(2-methylphenyl)maleimide, N-(4-hydroxyphenyl)maleimide, N-cyclohexyl maleimide or the like.

The respective monomer components (b) contained in the component (A) may be used alone or in the form of a mixture of any two or more thereof.

Further, the component (A) may contain a functional group-containing vinyl monomer as the other copolymerizable monomer component.

Examples of the functional group-containing vinyl monomers may include epoxy-containing unsaturated compounds such as glycidyl acrylate, glycidyl methacrylate and aryl glycidyl ether; hydroxy-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and hydroxystyrene; unsaturated carboxylic acid amides such as acrylamide and methacylamide; amino-containing unsaturated compounds such as acrylamine, aminomethyl methacrylate, methacrylic acid amino ether, aminopropyl methacrylate and aminostyrene; unsaturated acids such as acrylic acid and methacrylic acid; oxazoline group-containing unsaturated compounds such as vinyl oxazoline; or the like. These functional group-containing vinyl monomers may be used alone or in the form of a mixture of any two or more thereof. When such a functional group-containing unsaturated compound is copolymerized with the resin, the obtained resin can exhibit a high interfacial adhesion property (compatibility) to the other resin blended therewith.

The amount of the other copolymerizable monomer component used is preferably 0 to 40% by weight, more preferably 0 to 30% by weight, especially preferably 0 to 20% by weight based on the weight of the monomer component (b).

The graft ratio of the monomer component (b) in the rubber-reinforced resin (A) is in the range of 20 to 150%.

Here, the graft ratio (%) means a content of the monomer component (b) grafted to the rubber polymer, and is expressed by the value obtained according to the following formula:

$$\text{Graft ratio } (\%) = 100 \times (T-S)/S$$

wherein T represents the weight of insoluble component obtained by adding 1 g of the rubber-reinforced resin to 20 ml of acetone, shaking the mixture at room temperature for 2 hours using a shaker and then centrifuging the mixture using a centrifugal separator (rotating speed: 23,000 rpm) to separate the insoluble component from a soluble component; and S represents the weight of the rubber polymer contained in one gram of the rubber-reinforced resin.

When the graft ratio is too small, the obtained molded product may be deteriorated in impact strength. On the other hand, when the graft ratio is too large, the obtained molded product may be deteriorated in flame retardancy. Therefore, in order to improve the flame retardancy and physical properties of the obtained molded product, the graft ratio of the monomer component (b) in the rubber-reinforced resin (A) is usually 20 to 150%, preferably 30 to 120%, more preferably 40 to 120%.

In the resin composition of the present invention, the acetone-soluble component contained in the rubber-reinforced resin (A) has an intrinsic viscosity [η] of preferably 0.2 to 1.2 dl/g, more preferably 0.2 to 1 dl/g, especially preferably 0.3 to 1 dl/g when measured at 30° C. in methyl ethyl ketone. When the intrinsic viscosity lies within the above-specified range, it is possible to obtain a resin composition having excellent impact resistance, heat resistance and flame retardancy according to the present invention.

Meanwhile, the above graft ratio (%) and intrinsic viscosity [η] can be readily controlled by varying kinds and amounts of polymerization initiator, chain transfer agent, emulsifier, solvent, etc., which are used upon the polymerization of the rubber-reinforced resin.

Also, the acetone-soluble component contained in the rubber-reinforced resin (A) has a ratio of Mw/Mn of preferably 2 to 4, more preferably 2 to 3 (wherein Mw represents a weight-average molecular weight calculated as polystyrene, and Mn represents a number-average molecular weight calculated as polystyrene), when measured by gel permeation chromatography (GPC) using tetrahydrofuran (THF). When the ratio of Mw/Mn lies in the above-specified range, the obtained resin composition is well-balanced between moldability and impact resistance.

The graft copolymer (A1) can be produced by subjecting the monomer component (b) containing aromatic vinyl compound and cyanided vinyl compound as main components to radical graft polymerization by emulsion polymerization method or suspension polymerization method in the presence of the rubber polymer (a). In the emulsion polymerization method, there may be used polymerization initiator, chain transfer agent, water or the like.

Meanwhile, when the rubber polymer (a) and the monomer component (b) are polymerized to produce the graft copolymer (A1), the monomer component (b) may be added to the reaction system either at a batch, in parts or continuously in the presence of the rubber polymer (a). Also, the combination of the above addition methods may be used for the polymerization. Further, a part or whole of the rubber polymer (a) may be added in the course of the polymerization.

Examples of the polymerization initiators may include redox-type polymerization initiators containing an organohydroperoxide such as typically cumene hydroperoxide, diisopropylbenzene hydroperoxide and p-menthane hydroperoixde, and a reducing agent such as typically sugar-containing pyrophosphoric acid formulation and sulfoxylate formulation; persulfates such as potassium persulfate; and peroxides such as benzoyl peroxide, lauroyl peroxide, tert-butyl peroxylaurate and tert-butyl peroxymonocarbonate. The polymerization initiator may be added either at a batch or continuously to the polymerization system. The amount of the polymerization initiator used is usually 0.1 to 1.5% by weight, preferably 0.2 to 0.7% by weight based on the weight of the monomer component (b).

Examples of the chain transfer agents may include mercaptans such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; dimers of terpinolene or α-methyl styrene; or the like. These chain transfer agents may be used alone or in the form of a mixture of any two or more thereof. The amount of the chain transfer agent used is usually 0.05 to 2% by weight based on the weight of the monomer component (b).

As the emulsifiers used in the emulsion polymerization, there may be exemplified sulfates of higher alcohols, alkylbenzenesulfonates such as sodium dodecylbenzenesulfonate, aliphatic sulfonates such as sodium lauryl sulfate, higher aliphatic carboxylates, anionic surfactants such as phosphoric acid-based surfactants, and nonionic surfactants such as alkyl ester-type or alkyl ether-type polyethylene glycols. These emulsifiers may be used alone or in the form of a mixture of any two or more thereof. The amount of the emulsifier used is usually 0.3 to 5.0% by weight based on the weight of the monomer component (b).

Upon the production of the graft copolymer (A1) by emulsion polymerization, the obtained graft copolymer may be usually purified by coagulating the copolymer using a coagulant to form particles thereof, washing the particles with water and then drying the particles. As the coagulants, there may be used inorganic salts such as calcium chloride, magnesium sulfate, magnesium chloride and sodium chloride, and acids such as sulfuric acid and hydrochloric acid.

Meanwhile, the rubber-reinforced resin (A) may be constituted by the above graft copolymer (A1) solely or by a mixture of the graft copolymer (A1) and the copolymer (A2) of a monomer component (b'). Also, the monomer component (b') of the copolymer (A2) may be the same as or different from that of the monomer component (b) used for the production of the graft copolymer (A1). Preferably, the monomer component (b') of the copolymer (A2) may contain an aromatic vinyl compound and a cyanided vinyl compound. In addition, the above copolymer (A2) may be constituted by the combination (mixture) of two or more kinds of copolymers (A2).

The above copolymer (A2) can be produced by subjecting the monomer component (b') to emulsion polymerization, suspension polymerization or the like in addition to the above-described graft polymerization.

The acetone-soluble component contained in the above copolymer (A2) has an intrinsic viscosity [η] of preferably 0.2 to 1 dl/g, more preferably 0.3 to 1 dl/g, especially preferably 0.3 to 0.8 dl/g when measured at 30° C. in methyl ethyl ketone. When the intrinsic viscosity [η] of the acetone-soluble component lies in the above-specified range, it is possible to obtain a flame retardant thermoplastic resin composition having excellent impact resistance, heat resistance and flame retardancy according to the present invention. The intrinsic viscosity [η] of the acetone-soluble component contained in the copolymer (A2) can be controlled by the same method as used for that contained in the above graft copolymer.

Typical examples of the rubber-reinforced resins (A) may include combinations (mixtures) of the graft copolymer (A1) and the copolymer (A2) as illustrated below, though not limited thereto.

(1) Combination of acrylonitrile/butadiene/styrene resin and acrylonitrile/styrene resin; and (2) Combination of acrylonitrile/ethylene propylene/styrene resin and acrylonitrile/styrene resin The phosphorus-based flame retardant (B) may comprise a condensed phosphoric acid ester represented by the general formula (I):

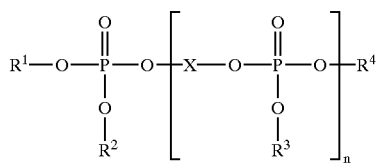

and/or a phosphazene compound.

The condensed phosphoric acid esters represented by the above general formula (I) may be used alone or in the form of a mixture of any two or more different kinds thereof.

In the general formula (I), $R^1$ to $R^4$ individually represent phenyl or xylenyl. The hydrogen atoms bonded to an aromatic ring of the phenyl group may be substituted with alkyl or the like. Also, X represents a group derived from a dihydroxy compound such as resorcinol and bisphenol A. The condensed phosphoric acid esters in themselves usable in the present invention are known in the art.

In the present invention, when two or more condensed phosphoric acid esters are used in the form of a mixture, "n" in the general formula (I) represents an average value of "n"s of the condensed phosphoric acid esters contained in the mixture. The value of "n" is 0.5 to 1.2, preferably 0.7 to 1.2, more preferably 0.9 to 1.1. When the "n" is too small, the obtained resin composition may be deteriorated in heat resistance, so that the molded product produced therefrom tends to suffer from appearance defects such as silver streaks. On the other hand, it may be difficult to produce condensed phosphoric acid esters having a too large value of "n".

As the phosphazene compounds used in the present invention, there may be exemplified linear phosphazenes represented by the following general formula (II) and/or cyclic phosphazenes represent by the following general formula (III) as described, for example, in "Studies in Inorganic Chemistry 6 Phosphorus (Third Edition)" (ELSEVIER).

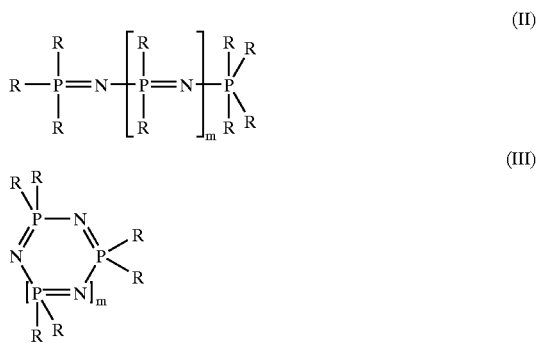

In the above general formulae (II) and (III), m is an integer of 0 to 15, preferably 1 to 10; R is a functional group selected from the group consisting of alkyl, allyl, alkoxy, aryloxy, amino and hydroxy. The alkoxy and aryloxy groups may be modified with alkyl, allyl, amino, hydroxy or the like. Also, the amino group may be modified with alkyl, allyl or the like.

Examples of the phosphazene compounds used in the present invention may include propoxyphosphazene, phenoxyphosphazene, methylphenoxyphosphazene, aminophosphazene, fluoroalkylphosphazene or the like. Among these phosphazene compounds, phenoxyphosphazene is preferred in view of facilitated production thereof.

These phosphazene compounds may be used alone or in the form of a mixture of any two or more thereof, for example, a mixture of cyclic and linear phosphazenes. The substituents Rs contained in a molecule of the phosphazene compound may be the same functional group or different two or more kinds of functional groups. Specific examples of the phosphazene compounds having different substituents Rs may include those prepared by first substituting a part of substitutable sites of the phosphazene molecule with phenoxy and then substituting the remaining substitutable sites thereof with propoxy, i.e., phenoxypropoxyphosphazenes.

The component (B) of the resin composition according to the present invention may be composed of one or both of the condensed phosphoric acid ester represented by the general formula (I) and the phosphazene compound represented by the general formula (II) or (III).

The amount of the component (B) blended is 5 to 20 parts by weight, preferably 5 to 18 parts by weight, more preferably 5 to 15 parts by weight based on 100 parts by weight of the rubber-reinforced resin (A). When the amount of the component (B) blended is less than 5 parts by weight, the obtained resin composition is insufficient in flame retardancy. On the other hand, when the amount of the component (B) blended is too large, the obtained resin composition is deteriorated in heat resistance.

The resin composition of the present invention may further contain a lubricant (C). The lubricant (C) is preferably composed of ethylene bis-stearylamide and/or methylene bis-stearylamide.

The amount of ethylene bis-stearylamide and/or methylene bis-stearylamide blended is usually 0.5 to 10 parts by weight, preferably 0.5 to 4 parts by weight, more preferably 0.5 to 3 parts by weight, especially preferably 1 to 3 parts by weight based on 100 parts by weight of the rubber-reinforced resin (A). When the amount of the lubricant blended lies in the above-specified range, the obtained resin composition exhibit more excellent flame retardancy and fluidity. When the amount of the lubricant blended is too large, the obtained resin composition may be deteriorated in flame retardancy.

The resin composition of the present invention comprises the components (A) and (B) or the components (A) to (C), and has a melt flow rate of preferably 30 to 80 g/10 minutes, more preferably 30 to 70 g/10 minutes, especially preferably 30 to 60 g/10 minutes when measured at 220° C. under a load of 98N according to JIS K7210. When the melt flow rate is too small or too large, the resin composition may be deteriorated in flame retardancy.

The melt flow rate of the resin composition according to the present invention varies depending upon graft ratio, cyanided vinyl compound content and rubber content of the component (A) as well as amounts of the components (B) and (C) blended. The melt flow rate may be usually controlled by varying the amount of the copolymer (A2) blended.

Further, the content of organic acids and/or oligomers in the resin composition of the present invention is preferably not more than 4% by weight, more preferably not more than 2.5% by weight, especially preferably not more than 2% by weight. When the content of organic acids and/or oligomers lies in the above-specified range, it is possible to avoid such a defective phenomenon that an inner molding surface of the mold is contaminated upon molding. The content of the organic acids can be determined by dissolving the resin composition in a solvent (1,4-dioxane), methyl-esterifying residual organic acids with diazomethane and then measuring the obtained methyl ester using a gas chromatograph equipped with hydrogen flame ionization detector.

Also, the resin composition of the present invention has a water content of preferably not more than 0.5% by weight, more preferably 0.3% by weight, especially preferably 0.2% by weight. When the water content lies in the above-specified range, the obtained resin composition is more excellent in discoloration resistance (color fastness). The water content is measured at 250° C. by Karl Fisher's method.

The resin composition of the present invention may contain, if required, fillers such as glass fibers, carbon fibers, wollastonite, talc, mica, kaolin, glass beads, glass flakes, milled fibers, zinc oxide whiskers and potassium titanate whiskers. These fillers may be used alone or in the form of a mixture of any two or more thereof. When these fillers are blended in the resin composition of the present invention, it is possible to impart a good stiffness thereto. Especially, when talc is blended in the resin composition of the present invention, it is possible to impart a good delustering property thereto. The glass fibers and the carbon fibers have preferably a fiber diameter of 6 to 20 $\mu$m and a fiber length of not less than 30 $\mu$m.

Further, the resin composition of the present invention may also contain various additives such as flame retardants such as antimony compounds, coupling agents, antibacterial agents, mildew-proofing agents, antioxidants, weather (light) resisting agents, plasticizers, colorants (such as pigments and dyes), anti-static agents and silicone oils, unless the addition thereof adversely affects the required performance of the resin composition.

Further, the resin composition of the present invention may be blended with the other polymers according to the required performance thereof. As the other polymers blended, there may be exemplified polycarbonates, polyethylene, polypropylene, polyamides, polyesters, polysulfones, polyethersulfones, polyphenylene sulfide, liquid crystal polymers, polyvinylidene fluoride, styrene/vinyl acetate copolymer, polyamide elastomers, polyamideimide elastomers, polyester elastomers, phenol resins, epoxy resins, novolak resins or the like.

The resin composition of the present invention can be obtained by kneading the respective components with each other using various extruders, banbury mixer, kneader, rolls, feederuder or the like. Among them, the use of extruders or banbury mixer is preferred. Upon kneading, the respective components may be added at a batch or in several parts. The kneading procedure may be conducted using a multi-stage feed type extruder. Alternatively, after the components are kneaded by banbury mixer, kneader or the like, the kneaded material may be pelletized using an extruder.

The thus obtained resin composition of the present invention may be shaped or molded into various products by injection molding, sheet extrusion, vacuum forming, profile molding, foaming, injection press, press molding, blow molding or the like.

Various molded products produced by the above molding methods are excellent in impact resistance, heat resistance and flame retardancy and, therefore, can be used in various applications such as office automation devices, domestic electric appliances, electric, electronic and telecommunication apparatuses, computers, sundries, sanitary goods, vehicle parts or the like. In particular, such products injection-molded using a pin-point gate can be suitably used as housings for devices with built-in electronic parts.

Thus, the resin composition of the present invention is a non-halogen-based composition, and is excellent in impact resistance, heat resistance and flame retardancy, especially practical impact resistance.

EXAMPLES

The present invention will be described in more detail by reference to the following examples. However, these examples are only illustrative and not intended to limit the present invention thereto.

Meanwhile, in Examples, Comparative Examples and Reference Examples, "part" and "%" represents "part by weight" and "% by weight", respectively, unless otherwise specified. Further, various properties were evaluated by the following methods.

Particle Size and Particle Size Distribution of Rubber Polymer

The sizes of particles dispersed in latex were measured by laser Doppler/frequency analysis. The measurement was conducted using a granulometer ("MICRO-TRACK UPA150, MODEL NO. 9340" manufactured by Nikkiso Co., Ltd.). Meanwhile, it was confirmed that the size of the rubber polymer particles dispersed in the rubber-reinforced resin were substantially identical to those dispersed in latex.

Gel Fraction (Content of Toluene-insoluble Components)

The gel fraction was measured by the above method described in the present specification.

Graft Ratio (Percentage)

The graft ratio was measured by the above method described in the present specification.

Intrinsic Viscosity [$\eta$]

The rubber-reinforced resin was added into acetone. The resultant mixture was shaken at room temperature for 2 hours using a shaker, and then centrifuged for 60 minutes using a centrifugal separator (rotating speed: 23,000 rpm), thereby separating the mixture into acetone-insoluble components and acetone-soluble components. The obtained acetone-soluble components were sufficiently dried by a vacuum dryer. The dried acetone-soluble components were dissolved in methyl ethyl ketone to prepare five solutions having different concentrations. The reduced viscosities of the five solutions was measured at 30° C. by Ubbellode viscometer. The intrinsic viscosities [$\eta$] (unit: dl/g) was calculated from the thus measured viscosities.

Fluidity (Melt Flow Rate)

The melt flow rate (unit: g/10 minutes) was measured at 220° C. under a load of 98N according to JIS K7210.

Impact Resistance (Izod Impact Strength)

A test specimen No. 2 according to JIS K7110 was molded using an injection molding machine J100E-C5 manufactured by Nippon Seikosho Co., Ltd., by setting cylinder temperature and mold temperature thereof to 220° C. and 50° C., respectively. The Izod impact strength (unit: J/m) of the test specimen was measured according to ASTM D256.

Heat Deformation Temperature (HDT)

A test specimen having a size of 6.4 mm in width×128 mm in length×12.8 mm in thickness, was measured under a bending stress of 18.5 kgf/cm² according to JIS K7207.

Flammability Evaluation (Flame Retardancy)

A test specimen of 5" in length×½" in width×1/12" in thickness was subjected to vertical flame test by the method prescribed in UL94. In the evaluation results, "V-2" represents V-2 acceptance in the vertical flame test, and "B" represents "burning", i.e., V-2 non-acceptance.

Falling Weight Impact Strength

The breaking energy of a test specimen having a size of 50 mm×80 mm×2.4 mm was measured using a high-speed impact tester "SERVO-PULSER EHF-2H-20L" manufactured by Shimadzu Seisakusho Co., Ltd. The measuring conditions were as follows: Specimen pedestal diameter: 30 mmφ; Striking bar tip: 12.7 mmR; Striking speed: 3.1 m/s. The unit of the falling weight impact strength is "kgf·cm".

Reference Example 1

Preparation of Rubber Polymer

As rubber polymers (a-1) to (a-3), there were used polybutadiene latexes shown in Table 1 below.

TABLE 1

| Rubber polymer | (a-1) | (a-2) | (a-3) |
|---|---|---|---|
| Polybutadiene latex Particle size distribution (%) | | | |
| not more than 150 nm | 12 | 48 | 13 |
| from more than 150 nm to less than 350 nm | 80 | 49 | 38 |
| not less than 350 nm | 8 | 3 | 49 |
| Gel fraction (%) | 78 | 82 | 69 |

Reference Example 2

Preparation of Component (A)

The rubber polymers (a-1) to (a-3) were respectively emulsion-polymerized with styrene and acrylonitrile as the monomer component (b) at mixing ratios shown in Table 2 thereby obtaining graft copolymers (A1-1) and (A1-2), and (A'1-1) to (A'1-6) having different graft ratios as shown in Table 2. Separately, only styrene and acrylonitrile as the monomer component (b) were solution-polymerized with each other at mixing ratios shown in Table 2, thereby obtaining copolymers (A2-1) to (A2-4). The intrinsic viscosities [η] of the thus obtained graft copolymers (A1) and copolymers (A2) are shown in Table 2.

TABLE 2

| | Rubber polymer | | Monomer component (part) | | Graft ratio (%) | Intrinsic viscosity [η] (dl/g) |
|---|---|---|---|---|---|---|
| | Kind | Part | Styrene | Acrylonitrile | | |
| A1-1 | (a-1) | 30 | 49 | 21 | 115 | — |
| A1-2 | (a-1) | 40 | 42 | 18 | 68 | — |
| A'1-1 | (a-1) | 50 | 35 | 15 | 18 | — |
| A'1-2 | (a-1) | 30 | 49 | 21 | 160 | — |
| A'1-3 | (a-1) | 30 | 49 | 21 | 160 | — |
| A'1-4 | (a-2) | 40 | 42 | 18 | 80 | — |
| A'1-5 | (a-3) | 30 | 49 | 21 | 102 | — |
| A'1-6 | (a-3) | 40 | 42 | 18 | 83 | — |
| A2-1 | — | — | 70 | 30 | — | 0.56 |
| A2-2 | — | — | 75 | 25 | — | 0.51 |
| A2-3 | — | — | 70 | 30 | — | 0.71 |
| A2-4 | — | — | 75 | 25 | — | 0.41 |

Reference Example 3

Preparation of Phosphorus-based Flame Retardant

The following condensed phosphoric acid esters (B-1) to (B-5) and phosphazene compound (B-6) were used as the component (B).

(B-1): Condensed phosphoric acid ester represented by the above general formula (I) wherein $R^1$ to $R^4$ are phenyl; X is a residue of bisphenol A; and n is 1.1.

(B-2): Condensed phosphoric acid ester represented by the above general formula (I) wherein $R^1$ to $R^4$ are 2,6-xylenyl; X is a residue of resorcinol; and n is 1.0.

(B-3): Condensed phosphoric acid ester represented by the above general formula (I) wherein $R^1$ to $R^4$ are phenyl; X is a residue of bisphenol A; and n is 0.6.

(B-4): Triphenyl phosphate represented by the above general formula (I) wherein $R^1$ to $R^4$ are phenyl; and n is 0.

(B-5): Condensed phosphoric acid ester represented by the above general formula (I) wherein $R^1$ to $R^4$ are phenyl; X is a residue of bisphenol A; and n is 0.3.

(B-6): Phenoxy phosphazene represented by the following formula (IV) (a mixture of (y=1) and (y=2) compounds):

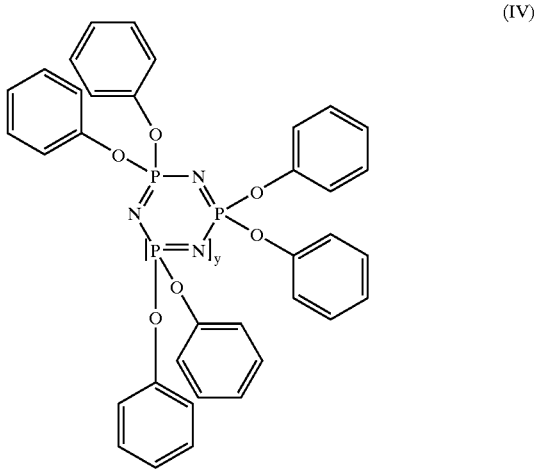

(IV)

Reference Example 4

Preparation of Component (C)

As the component (C), there was used ethylene bis-stearylamide produced by Kao Co., Ltd.

Examples 1 to 8

Comparative Examples 1 to 12

The respective components were mixed together for 3 minutes at mixing ratios shown in Tables 3 to 5 using a Henschel mixer. Then, the resultant mixture was melt-extruded from an NVC-type 50-mm vented extruder manufactured by Nakatani Kikai Co., Ltd., by setting the cylinder temperature to 180 to 220° C., thereby obtaining pellets. The thus obtained pellets were sufficiently dried, and then injection-molded using an injection molding machine J100E-C5 manufactured by Nippon Seikosho Co., Ltd., by setting the cylinder temperature and mold temperature to 200° C. and 50° C., respectively, thereby obtaining test specimens for various evaluation tests. The test specimens were tested by the above evaluation methods. The results are shown in Tables 3 to 5.

TABLE 3

| Examples | 1 | 2 | 3 | 4 | 5 | 6 | 7 | 8 |
|---|---|---|---|---|---|---|---|---|
| Composition (part) | | | | | | | | |
| Component (A) | | | | | | | | |
| (A1-1) | 40 | — | 30 | 30 | 20 | — | 40 | 40 |
| (A1-2) | — | 45 | — | 10 | 20 | 40 | — | — |
| (A2-1) | 60 | — | 70 | 60 | 60 | 60 | 60 | 60 |
| (A2-2) | — | 55 | — | — | — | — | — | — |
| Properties of component (A) | | | | | | | | |
| Rubber content (%) | 12 | 18 | 9 | 13 | 14 | 16 | 12 | 12 |
| Graft ratio (%) | 115 | 68 | 115 | 101 | 88 | 68 | 115 | 115 |
| Component (B) | | | | | | | | |
| (B-1) (n = 1.1) | 10 | — | 6 | — | 12 | — | — | 10 |
| (B-2) (n = 1.0) | — | 14 | — | 12 | — | — | — | — |
| (B-3) (n = 0.6) | — | — | — | — | — | 10 | — | — |
| (B-4) (n = 0) | — | — | — | — | — | — | — | — |
| (B-5) (n = 0.3) | — | — | — | — | — | — | — | — |
| (B-6) | — | — | — | — | — | — | 10 | — |
| Component (C) | 2 | 2 | 3 | 0.5 | 2 | 1 | 2 | — |
| Evaluation results | | | | | | | | |
| Fluidity (g/10 min.) | 49 | 42 | 73 | 35 | 41 | 49 | 44 | 46 |
| Izod impact strength (J/m) | 14 | 19 | 10 | 15 | 17 | 23 | 15 | 16 |
| Heat deformation temperature (HDT) (° C.) | 83 | 81 | 79 | 82 | 83 | 80 | 79 | 80 |
| Burning property | V-2 | V-2 | V-2 | V-2 | V-2 | V-2 | V-2 | V-2 |
| Falling weight impact strength | 390 | 450 | 430 | 390 | 380 | 450 | 390 | 410 |

TABLE 4

| Comparative Examples | 1 | 2 | 3 | 4 | 5 | 6 |
|---|---|---|---|---|---|---|
| Composition (part) | | | | | | |
| Component (A) | | | | | | |
| (A1-1) | 20 | — | 30 | 50 | — | — |
| (A1-2) | — | 55 | — | — | — | — |
| (A'1-1) | — | — | — | — | 20 | — |
| (A'1-2) | — | — | — | — | — | 50 |
| (A2-1) | 60 | — | 70 | 50 | 80 | 50 |
| (A2-2) | — | — | — | — | — | — |
| (A2-3) | 20 | — | — | — | — | — |
| (A2-4) | — | 45 | — | — | — | — |
| Properties of component (A) | | | | | | |
| Rubber content (%) | 6 | 22 | 9 | 15 | 10 | 15 |
| Graft ratio (%) | 115 | 68 | 115 | 115 | 48 | 135 |
| Component (B) | | | | | | |
| (B-1) (n = 1.1) | — | 8 | 4 | 21 | 10 | 7 |
| (B-2) (n = 1.0) | 15 | — | — | — | — | — |
| (B-3) (n = 0.6) | — | — | — | — | — | — |
| (B-4) (n = 0) | — | — | — | — | — | — |
| Component (C) | 1.5 | 1 | 2 | 3 | 2 | 2 |
| Evaluation results | | | | | | |
| Fluidity (g/10 min.) | 71 | 32 | 65 | 58 | 72 | 36 |
| Izod impact strength (J/m) | 4 | 28 | 13 | 18 | 6 | 24 |
| Heat deformation temperature (HDT) (° C.) | 79 | 85 | 87 | 70 | 81 | 83 |
| Burning property | V-2 | B | B | V-2 | V-2 | B |
| Falling weight impact strength | 90 | 120 | 110 | 115 | 85 | 110 |

TABLE 5

| Comparative Examples | 7 | 8 | 9 | 10 | 11 | 12 |
|---|---|---|---|---|---|---|
| Composition (part) | | | | | | |
| Component (A) | | | | | | |
| (A1-1) | — | — | — | — | 20 | 20 |
| (A1-2) | — | — | — | — | 20 | 20 |
| (A'1-3) | 45 | — | — | — | — | — |
| (A'1-4) | — | 40 | — | — | — | — |
| (A'1-5) | — | — | 45 | — | — | — |
| (A'1-6) | — | — | — | 40 | — | — |
| (A2-1) | 55 | 60 | 55 | 60 | 60 | 60 |
| Properties of component (A) | | | | | | |
| Rubber content (%) | 14 | 16 | 14 | 16 | 14 | 14 |
| Graft ratio (%) | 105 | 80 | 102 | 83 | 88 | 88 |
| Component (B) | | | | | | |
| (B-1) (n = 1.1) | — | 10 | 10 | 10 | — | — |
| (B-2) (n = 1.0) | 10 | — | — | — | — | — |
| (B-3) (n = 0.6) | — | — | — | — | — | — |
| (B-4) (n = 0) | — | — | — | — | 12 | — |
| (B-5) (n = 0.3) | — | — | — | — | — | 12 |
| Component (C) | 2 | 2 | 2 | 2 | 1 | 1 |
| Evaluation results | | | | | | |
| Fluidity (g/10 min.) | 38 | 44 | 47 | 42 | 79 | 76 |
| Izod impact strength (J/m) | 13 | 12 | 14 | 11 | 15 | 16 |
| Heat deformation temperature (HDT) (° C.) | 84 | 82 | 81 | 80 | 72 | 73 |
| Burning property | V-2 | V-2 | V-2 | V-2 | V-2 | V-2 |
| Falling weight impact strength | 120 | 90 | 70 | 105 | 300 | 310 |

As is apparent from Examples 1 to 8, the resin compositions of the present invention all were excellent in impact resistance, heat resistance and flame retardancy.

On the other hand, the resin composition obtained in Comparative Example 1 in which the content of the rubber polymer in the component (A) was reduced out of the range defined by the present invention, was deteriorated in impact resistance. The resin composition obtained in Comparative Example 2 in which the content of the rubber polymer in the component (A) was increased out of the range defined by the present invention, was deteriorated in flame retardancy. The resin composition obtained in Comparative Example 3 in which the amount of the component (B) blended was reduced out of the range defined by the present invention, was deteriorated in flame retardancy. The resin composition obtained in Comparative Example 4 in which the amount of the component (B) blended was increased out of the range defined by the present invention, was deteriorated in heat resistance. The resin composition obtained in Comparative Example 5 in which the graft ratio of the rubber polymer in the component (A) was reduced out of the range defined by the present invention, was deteriorated in impact resistance. The resin composition obtained in Comparative Example 6 in which the graft ratio of the rubber polymer in the component (A) was increased out of the range defined by the present invention, was deteriorated in flame retardancy.

In Comparative Examples 7 and 8, the particle size distribution of the rubber polymer in the component (A) was out of the range defined by the present invention. Namely, in these Comparative Examples, the rubber polymer particles having a particle size of not more than 150 nm were blended in a too large amount, and those having a particle size of from more than 150 nm to less than 350 nm were blended in a too small amount. The resin compositions obtained in Comparative Examples 7 and 8 were deteriorated in falling weight impact strength.

In Comparative Examples 9 and 10, the particle size distribution of the rubber polymer in the component (A) was out of the range defined by the present invention. Namely, in these Comparative Examples, the rubber polymer particles having a particle size of from more than 150 nm to less than 350 nm were blended in a too small amount, and those having a particle size of not less than 350 nm were blended in a too large amount. The resin compositions obtained in Comparative Examples 7 and 8 were also deteriorated in falling weight impact strength.

The resin compositions obtained in Comparative Examples 11 and 12 in which the value "n" of the condensed phosphoric acid ester contained in the component (B) was reduced out of the range defined by the present invention, was deteriorated in heat resistance.

What is claimed is:
1. A flame retardant thermoplastic resin composition comprising:
   (A) 100 parts by weight of a rubber-reinforced thermoplastic resin comprising:
      a graft copolymer (A1) produced by graft-polymerizing a monomer component (b) containing an aromatic vinyl compound, a cyanided vinyl compound and, if required, the other copolymerizable monomer in the presence of a rubber polymer (a) containing polymer particles having a particle size of not more than 150 nm in an amount of 0 to 15% by weight, polymer particles having a particle size of from more than 150 to less than 350 nm in an amount of 60 to 100% by weight and polymer particles having a particle size of not less than 350 nm in an amount of 0 to 40% by weight, or a mixture of the graft copolymer (A1) and a copolymer (A2) of monomer component (b'),
      said rubber-reinforced thermoplastic resin (A) having a graft ratio of 20 to 150% and a rubber polymer content of 8 to 20% by weight; and
   (B) 5 to 20 parts by weight of a phosphorus-based flame retardant comprising a condensed phosphoric acid ester, a phosphazene compound or mixture thereof, which condensed phosphoric acid ester is represented by the general formula (I):

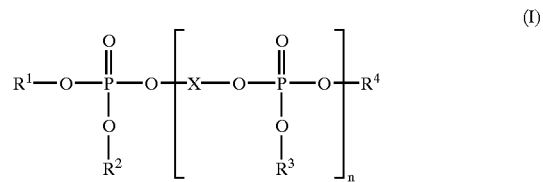

(I)

wherein $R^1$, $R^2$, $R^3$ and $R^4$ are independently phenyl or xylenyl;

X is a divalent group derived from resorcinol or bisphenol A;

and n is 0.5 to 1.2.

2. A flame retardant thermoplastic resin composition according to claim 1, further comprising 0.5 to 10 parts by weight of a lubricant (C) based on 100 parts by weight of the component (A).

3. A flame retardant thermoplastic resin composition according to claim 2, wherein said lubricant (C) is ethylene bis-stearylamide, methylene bis-stearylamide or a mixture thereof.

4. A flame retardant thermoplastic resin composition according to claim 1, wherein said composition has a melt flow rate of 30 to 80 g/10 minutes when measured at 220° C. under a load of 98N according to JIS K7210.

* * * * *